(12) United States Patent
Atchison et al.

(10) Patent No.: US 10,430,175 B2
(45) Date of Patent: Oct. 1, 2019

(54) THERMOSTAT WITH SOFTWARE UPDATE FEATURES

(71) Applicant: Johnson Controls Technology Company, Plymouth, MI (US)

(72) Inventors: Shaun B. Atchison, Wichita, KS (US); Theresa N. Gillette, Wichita, KS (US); Jonathan A. Burns, Wichita, KS (US)

(73) Assignee: Johnson Controls Technology Company, Auburn Hills, MI (US)

( * ) Notice: Subject to any disclaimer, the term of this patent is extended or adjusted under 35 U.S.C. 154(b) by 80 days.

(21) Appl. No.: 15/340,930

(22) Filed: Nov. 1, 2016

(65) Prior Publication Data

US 2018/0121190 A1     May 3, 2018

(51) Int. Cl.
*G06F 9/44* (2018.01)
*G06F 8/65* (2018.01)
*F24F 11/63* (2018.01)
*F24F 11/30* (2018.01)
*F24F 11/62* (2018.01)
*F24F 11/32* (2018.01)
*F24F 11/58* (2018.01)
*F24F 11/61* (2018.01)
*F24F 11/52* (2018.01)

(52) U.S. Cl.
CPC ............... *G06F 8/65* (2013.01); *F24F 11/30* (2018.01); *F24F 11/32* (2018.01); *F24F 11/52* (2018.01); *F24F 11/58* (2018.01); *F24F 11/61* (2018.01); *F24F 11/62* (2018.01); *F24F 11/63* (2018.01)

(58) Field of Classification Search
CPC ....................................................... G06F 8/65
See application file for complete search history.

(56) References Cited

U.S. PATENT DOCUMENTS

| | | | |
|---|---|---|---|
| 6,735,625 B1* | 5/2004 | Ponna | H04L 67/34 704/220 |
| 7,055,759 B2 | 6/2006 | Wacker et al. | |
| 7,076,536 B2* | 7/2006 | Chiloyan | G06F 9/4411 709/220 |
| 7,083,109 B2 | 8/2006 | Pouchak | |
| 7,222,800 B2 | 5/2007 | Wruck | |
| 8,762,666 B2 | 6/2014 | Grohman et al. | |
| 9,389,850 B2 | 7/2016 | Walter et al. | |
| 9,804,901 B2 | 10/2017 | Gambardella et al. | |
| 9,826,601 B2 | 11/2017 | Vangeel et al. | |
| 9,870,222 B2 | 1/2018 | Sugimura | |
| 9,879,873 B2 | 1/2018 | Malve et al. | |
| 2001/0039590 A1* | 11/2001 | Furukawa | H04L 29/12009 709/238 |
| 2005/0289467 A1 | 12/2005 | Imhof et al. | |
| 2006/0037015 A1* | 2/2006 | Mihai | G06F 9/4415 717/176 |

(Continued)

*Primary Examiner* — Hang Pan
(74) *Attorney, Agent, or Firm* — Foley & Lardner LLP

(57) ABSTRACT

A thermostat for a building includes a communications interface communicably coupled to an HVAC network and a processing circuit. The processing circuit is configure to determine that a HVAC device is connected to the HVAC network and retrieve a software update from the HVAC device via the communications interface and install the software update in response to a determination that the thermostat must install the software update in order to be configured to communicate with the HVAC device.

20 Claims, 8 Drawing Sheets

(56) References Cited

U.S. PATENT DOCUMENTS

| | | | |
|---|---|---|---|
| 2009/0261174 A1 | 10/2009 | Butler et al. | |
| 2015/0074658 A1* | 3/2015 | Gourlay | G05B 15/02 717/172 |
| 2015/0331688 A1 | 11/2015 | Shimizu | |
| 2015/0334165 A1* | 11/2015 | Arling | G05B 15/02 717/177 |
| 2016/0321061 A1 | 11/2016 | Walter et al. | |
| 2017/0212487 A1 | 7/2017 | Gupta et al. | |

* cited by examiner

THERMOSTAT WITH SOFTWARE UPDATE FEATURES

BACKGROUND

The present disclosure relates generally to building efficiency systems and devices. The present disclosure relates more particularly to HVAC controls and thermostats.

Thermostats must have the proper software version installed in order to properly communicate with HVAC control devices. When new control devices are installed in a building, the thermostat may need to update to a particular software version in order to communicate with the HVAC control devices. The conventional method for updating software for a thermostat usually involves loading new software onto the thermostat through a storage devices such as an SD card or a USB flash drive.

SUMMARY

One implementation of the present disclosure is a thermostat for a building. The thermostat includes a communications interface communicably coupled to an HVAC network and a processing circuit. The processing circuit is configured to determine that a HVAC device is connected to the HVAC network. The processing circuit is further configured to retrieve a software update from the HVAC device via the communications interface and install the software update in response to a determination that a software update is needed in order to be configured to communicate with the HVAC device.

In some embodiments, the thermostat further includes a user interface configured to present information to a user and receive input from the user. In some embodiments, the processing circuit is configured to cause the user interface to display a message prompting the user to give permission to the thermostat to retrieve and install the software update from the HVAC device and retrieve and install the software update in response to a determination that the user gives the permission to the thermostat.

In some embodiments, the thermostat further includes a user interface configured to present information to a user and receive input from the user. The processing circuit is configured to cause the user interface to display a message prompting the user to call a service technician in response to a determination that the thermostat has failed to retrieve the software update from the HVAC device. The processing circuit is configured to receive the software update from a software update server via the communications interface and install the software update.

In some embodiments, the processing circuit is configured to determine that the software update can be retrieved from the HVAC device based on a network address of the HVAC device received via the communications interface. The thermostat may further include a database of network addresses associated with HVAC devices that can push software updates to the thermostat.

In some embodiments, the processing circuit is configured to determine if the software update can be retrieved from the HVAC device by searching the database with the network address.

In some embodiments, the processing circuit is configured to cause the communications interface to send configuration commands to the HVAC device in response to a determination that the software update has been successfully installed.

In some embodiments, the processing circuit is configured to generate control signals for the HVAC device. In some embodiments, the control signals cause the HVAC device to heat or cool the building to a setpoint and cause the communications interface to send the control signals to the HVAC device.

In some embodiments, the processing circuit is configured to determine that the HVAC device is connected to the HVAC network based on receiving, via the communications interface, an unrecognized network address.

In some embodiments, the processing circuit is configured to determine the software version necessary for communicating with the HVAC device by sending a message to a software update server via the HVAC network. The message may include an identifier associated with the HVAC device and a current software version of the thermostat.

Another implementation of the present disclosure is a method for updating software for a thermostat. The method includes determining, by a processor, that a HVAC device is connected to an HVAC network. The method includes determining, by the processor, a software version necessary for communicating with the HVAC device. The method includes retrieving, via the HVAC network, a software update corresponding to the software version from the HVAC device in response to a determination that the thermostat must install the software update in order to be configured to communicate with the HVAC device. The method further includes installing, via the processor, the software update in response to the determination that the thermostat must install the software update in order to be configured to communicate with the HVAC device.

In some embodiments, the method further includes causing a user interface to display a message prompting a user to give permission to the thermostat to retrieve the software update from the HVAC device and install the software update and retrieving the software update and installing the software update in response to a determination that the user gives the permission to the thermostat.

In some embodiments, the method includes causing the user interface to display a message prompting a user to call a service technician in response to a determination that the thermostat has failed to retrieve the software update from the HVAC device and receiving the software update from a software update server via a communications interface and installing the software update.

In some embodiments, the method further includes performing configuration steps for the HVAC device in response to a determination that the software update has been successfully installed.

In some embodiments, the method further includes generating control signals for the HVAC device, wherein the control signals cause the HVAC device to heat or cool the building to a setpoint and causing a communications interface to send the control signals to the HVAC device.

In some embodiments, determining that the HVAC device is connected to the HVAC network includes determining that an unrecognized network address is received via a communications interface.

Another implementation of the present disclosure is a master device for an HVAC network. The master device includes a communications interface communicably coupled to an HVAC network and a processing circuit. The processing circuit is configured to determine that a HVAC device is connected to the HVAC network. The processing circuit is configured to retrieve a software update from the HVAC device via the communications interface and install the software update in response to a determination that the master device must install the software update in order to be configured to communicate with the HVAC device. The processing circuit is configured to cause the communications interface to send configuration commands to the HVAC device in response to the determination that the master device has installed the software update in order to be configured to communicate with the HVAC device.

In some embodiments, the master device further includes a user interface configured to present information to a user and receive input from the user. The processing circuit may be configured to cause the user interface to display a message prompting the user to give permission to the master device to retrieve and install the software update from the HVAC device and retrieve and install the software update in response to a determination that the user gives the permission to the master device.

In some embodiments, the master device includes a user interface configured to present information to a user and receive input from the user. The processing circuit may be configured to cause the user interface to display a message prompting the user to call a service technician in response to the determination that the master device must install the software update in order to be configured to communicate with the HVAC device and receive the software update from a software update server via the communications interface and install the software update.

In some embodiments, the master device includes a user interface configured to present information to a user and receive input from the user. The processing circuit may be configured to cause the user interface to display a message prompting the user to call a service technician in response to the determination that the master device must install the software update in order to be configured to communicate with the HVAC device and receive the software update from a software update server via the communications interface and install the software update.

In some embodiments, the processing circuit is configured to determine that the software update can be retrieved from the HVAC device based on a network address of the HVAC device received via the communications interface. The master device may include a database of network address associated with HVAC devices that can push software updates to the master device.

BRIEF DESCRIPTION OF THE DRAWINGS

The exemplary embodiments will become more fully understood from the following detailed description, appended claims and the accompany drawings, which are briefly described below and wherein like numerals denote like elements:

DETAILED DESCRIPTION

Overview

Referring generally to the FIGURES, systems and methods for updating the software of a thermostat based on software stored on an HVAC device is shown, according to various exemplary embodiments. In some embodiments, when an HVAC device is first installed in a building and connected to an HVAC network, the thermostat may communicate with the HVAC device and determine the proper steps for configuring the HVAC device. In some embodiments, the thermostat recognizes the new HVAC device and determines that the thermostat has the correct firmware to configure the new HVAC device and performs the configuration without updating the software of the thermostat.

In some embodiments, the thermostat requests and/or is pushed a software update directly from the HVAC device. The thermostat may send the request to the new HVAC device in response to a determination that the thermostat does not have the proper software to communicate with and/or control the HVAC device. The HVAC controls may send the software update over a network and/or directly to the thermostat. The thermostat may install the software update and configure the HVAC device based on the new software. In various embodiments, the thermostat may determine that the HVAC device does not store the appropriate software update. The thermostat can communicate with a network server and request the proper software update be transmitted via a network connect. In various embodiments, a technician may cause the networks server to push a software update to the thermostat. The thermostat can install the software update from the server and can then configure the HVAC device based on the software update received from the server. In some embodiments, the software update necessary for communicating with the HVAC controls cannot be retrieved directly from the HVAC device and/or the network server. The thermostat may be configured to prompt a user to manually install (e.g., via an SD card, via a USB driver, etc.) a certain software update necessary for communicating with the HVAC device.

Building Management System and HVAC System

Figure 1:
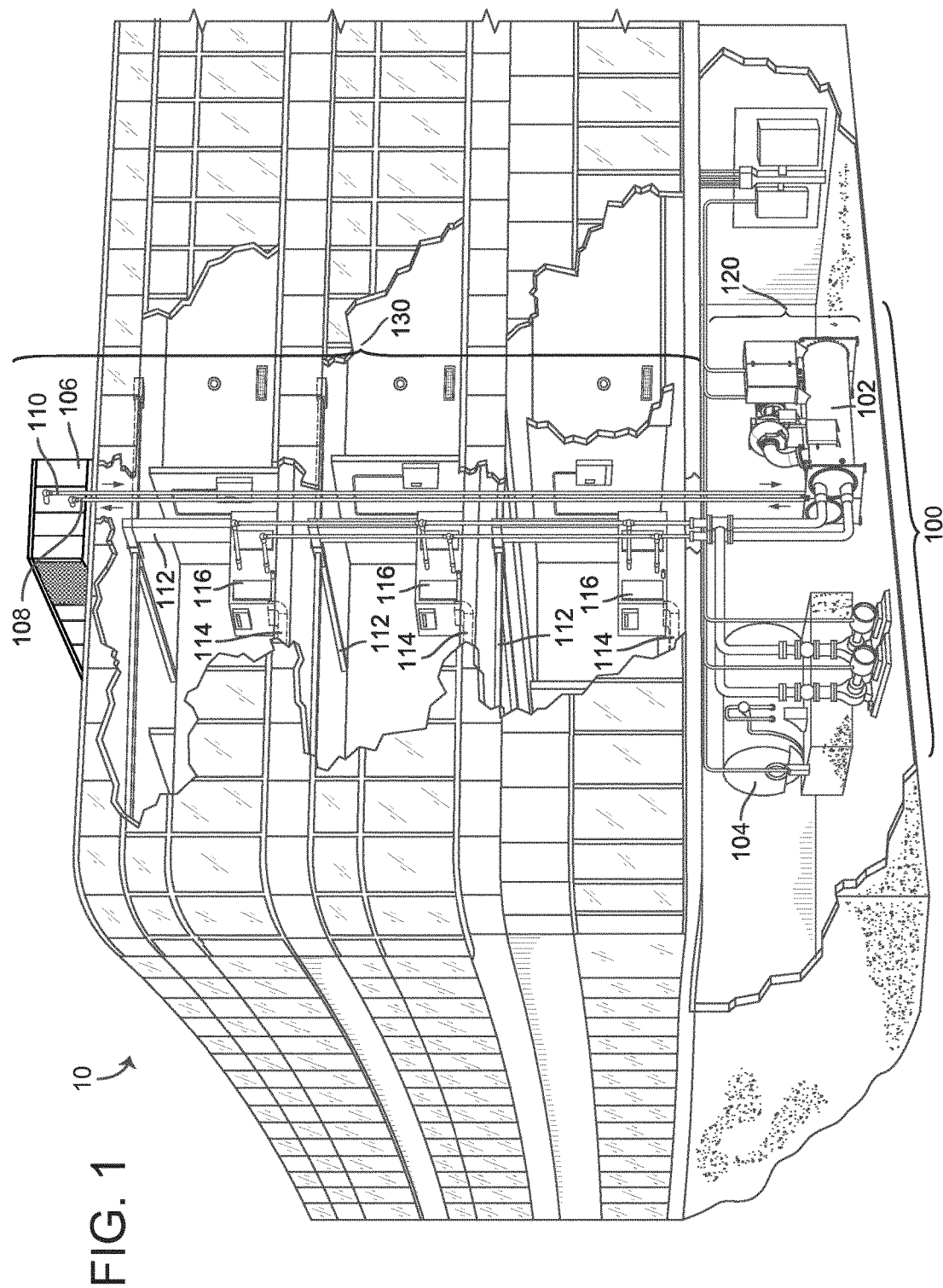
FIG. 1 is a schematic drawing of a building equipped with an HVAC system, according to an exemplary embodiment.
Figure 2:
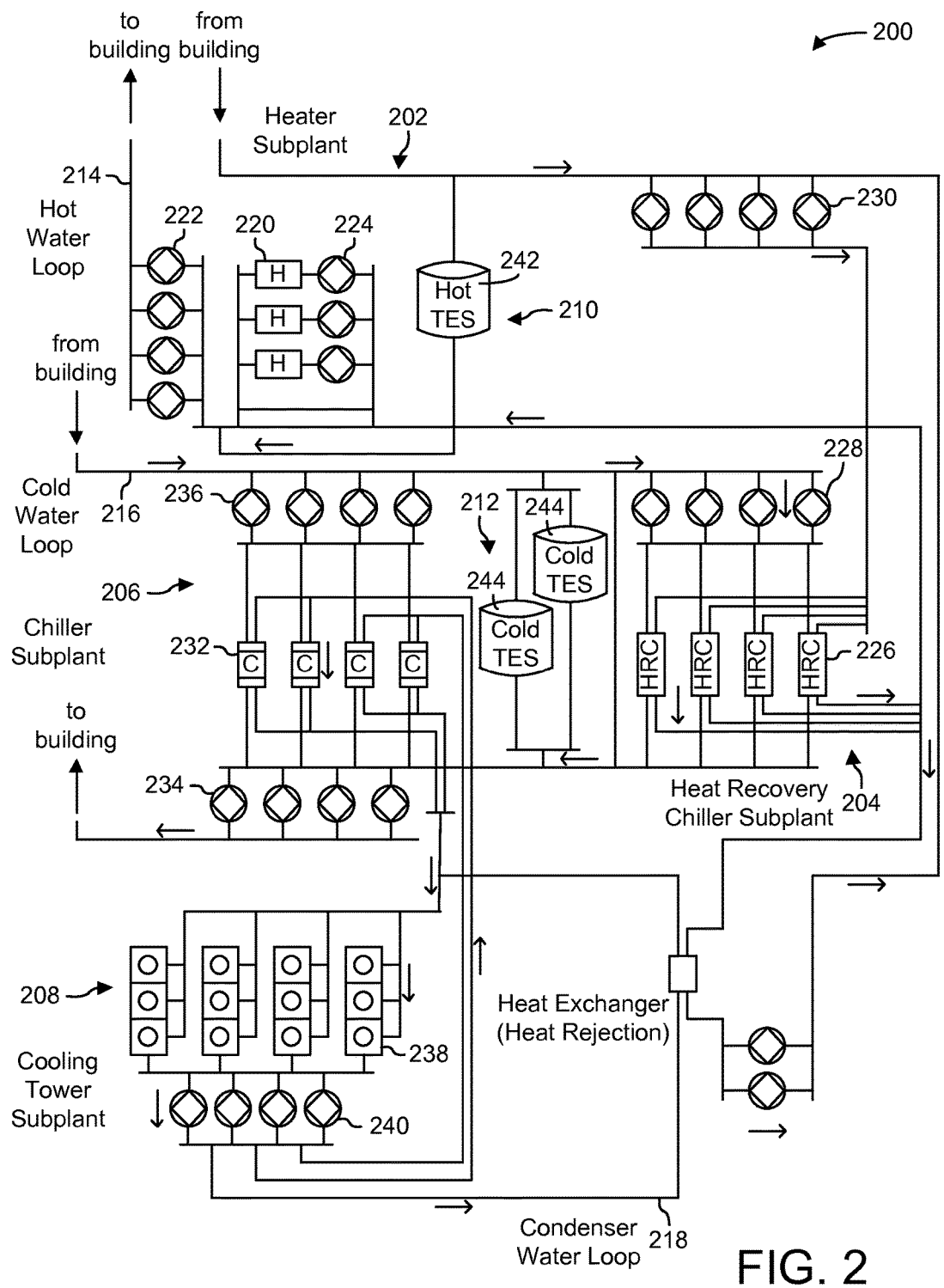
FIG. 2 is a block diagram of a waterside system that may be used in conjunction with the building of FIG. 1, according to an exemplary embodiment.
Figure 3:
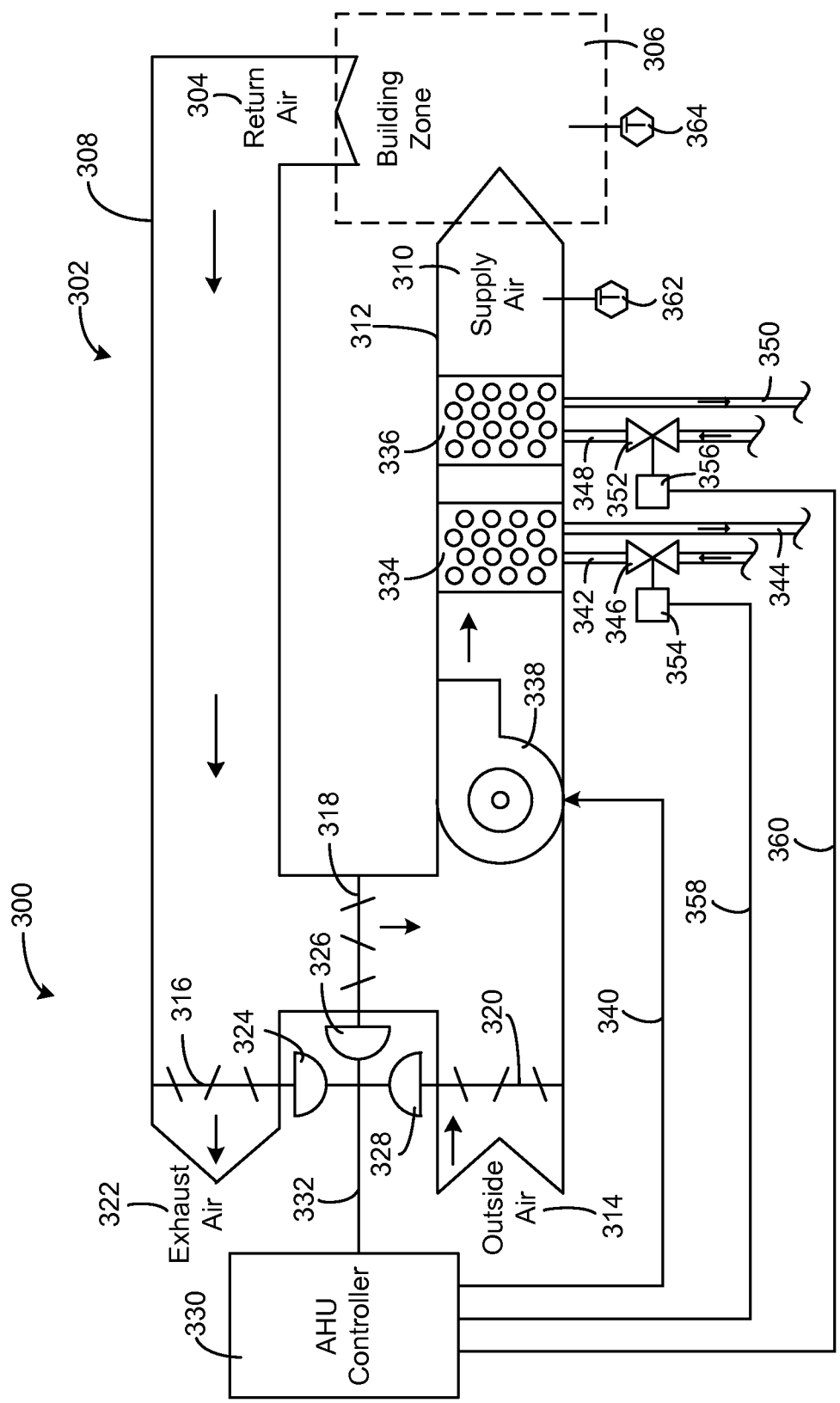
FIG. 3 is a block diagram of an airside system that may be used in conjunction with the building of FIG. 1, according to an exemplary embodiment.

Referring now to FIGS. 1-3, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, N2, BACnet, BACnet MS/TP etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Systems and Methods for Thermostat Software Updates

Figure 4:
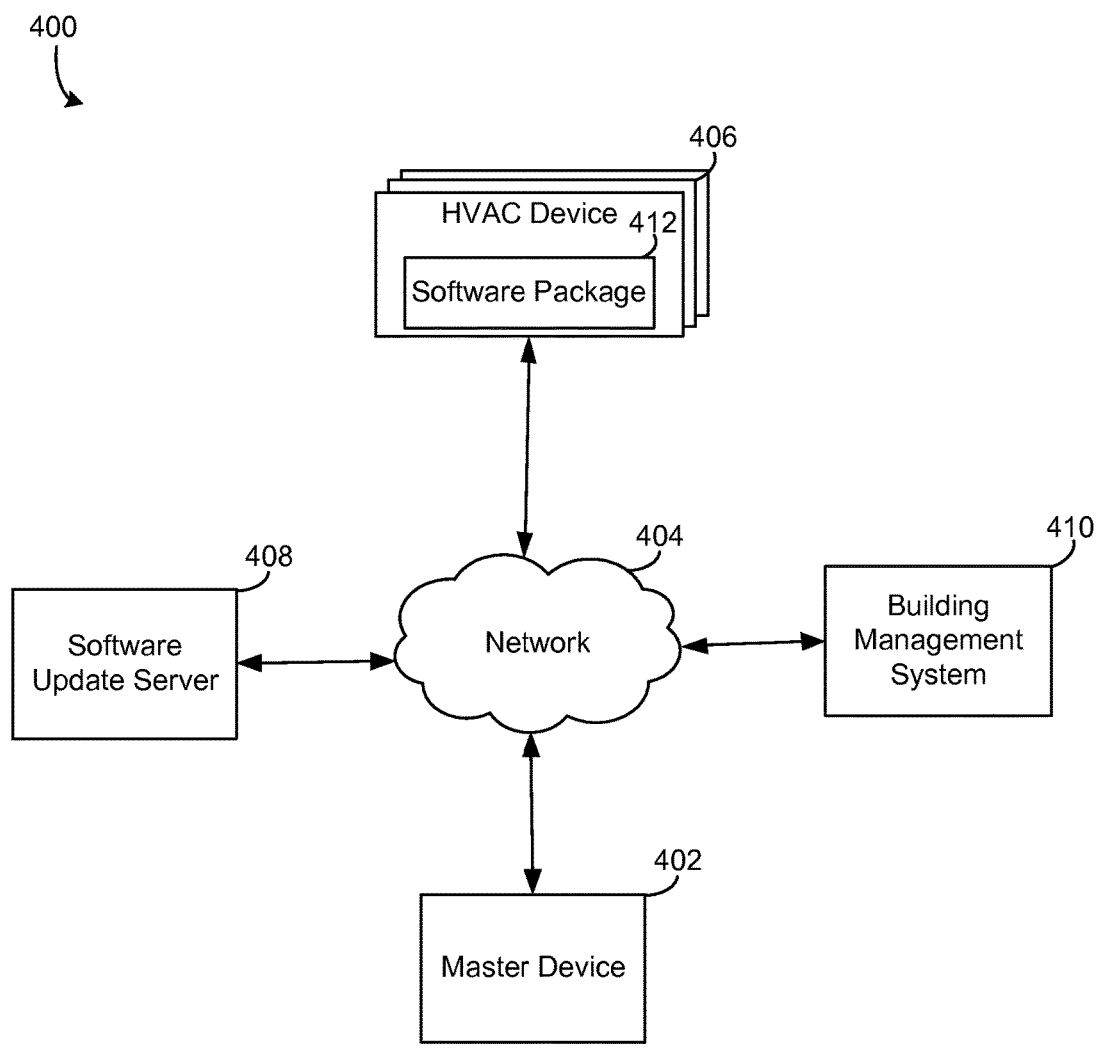
FIG. 4 is a diagram of a communications system located in the building of FIG. 1, according to an exemplary embodiment.

Referring now to FIG. 4, a block diagram of communications system 400 is shown, according to an exemplary embodiment. System 400 can be implemented inside and/or outside a building (e.g. building 10) and is shown to include a master device 402, a network 404, HVAC device(s) 406, a software update server 408, and a building management system 410. In some embodiments, master device 402 is a thermostat, an HVAC controller, a smart actuator, a smart heater, a smart damper, an RTU, a chiller, an AHU, and/or any other HVAC device. In some embodiments, master device 402 is configured to generate control commands for HVAC device(s) 406 and send the commands to the HVAC device(s) 406 via network 404. In some embodiments, the control commands cause environmental conditions of a building (e.g., building 10) to be controlled to environmental setpoints (e.g., temperature setpoint, humidity setpoint, etc.)

In some embodiments, network 404 is at least one of and/or a combination of a Wi-Fi network, a wired Ethernet network, a Zigbee network, and a Bluetooth network. In some embodiments, network 404 is an HVAC network. In various embodiments, the HVAC network operates with a proprietary communication protocol. Network 302 may be a local area network or a wide area network (e.g., the Internet, a building WAN, etc.) and may use a variety of communications protocols (e.g., N2, BACnet, BACnet MS/TP, IP, LON, etc.) In various embodiments, the communications protocols may be physically implemented over RS-485, RS-232, RS-422, PS/2, USB, fire wire, Ethernet, etc. Network 404 may include routers, cables, network switches, connectors, wireless repeaters, radio modules, and/or any other component necessary for implementing wireless and/or wired communication.

HVAC device 406 can be a smart actuator. The smart actuator may be a damper actuator, a pneumatic actuator, a threaded ball valve, and/or any other kind of actuator. HVAC device(s) 406 can be sensors. The sensors may be carbon dioxide sensors, humidity sensors, occupancy sensors, pressure sensors, temperature sensors, network sensors, and/or any other type of sensor. HVAC device 406 can be a variable speed drive, a variable air volume (VAV) systems, a roof top unit (RTU), a thermostat, an AHU, an AC system, a controller, and/or any other device and/or system. In some embodiments, HVAC device(s) 406 are indoor control devices and/or systems and/or outdoor control devices and/or systems. In FIG. 4, HVAC device 406 can store software package 412 and/or a plurality of software packages. Software package 412 may contain all necessary information for master device 402 to communicate with and/or operate HVAC device 406. In various embodiments, software package 412 is an operating system for master device 402 and/or any other software package and/or update for master device 402. In some embodiments, HVAC device 406 may be configured to transmit software package 412 or a portion of software package 412 (i.e., a software patch, software plugin, etc.) to master device 402. In some embodiments, master device 402 must retrieve and install software package 412 before it can control and/or communicate with HVAC device 406.

Software update server 408 may communicate with HVAC device(s) 406, master device 402, and building management system 410. Software update server 408 can update software package 412 and/or can update software for master device 402. In various embodiments, a technician may cause software update server 408 to push a software update to master device 402. For example, a customer may place a call to the technician requesting that the software on their thermostat (e.g., master device 402) be updated. The technician may cause software update server 408 to push a software update to the thermostat via network 404.

In some embodiments, master device 402 can send a request to software update server 408 for a specific software update. Software update server 408 may respond by pushing the specific software update to master device 402. In various embodiments, master device 402 can send a request for an unknown software version needed to control and/or communicate with a particular HVAC device (e.g., HVAC device 406). In some embodiments, software update server 408 can determine the appropriate software version for master device 402 based on the identity of the HVAC device 406. Software update server 408 may push the software to master device 402. Master device 402 may install the software update pushed from software update server 408.

Building management system 410 may be configured to communicate with master device 402 via network 404. Building management system 410 may be configured to adjust heating and/or cooling to the building of FIG. 1 and/or control the lighting of the building of FIG. 1 by generating control signals for HVAC device(s) 406. In some embodiments, building management system 410 receives zone and/or building control information (e.g., data, control signals, temperatures, humidities, etc.) from master device 402. The control information may be an environmental setpoint such as a temperature setpoint and/or a humidity setpoint. Further, the control information may be a lighting control signal and/or any other facility control signal.

Figure 5:
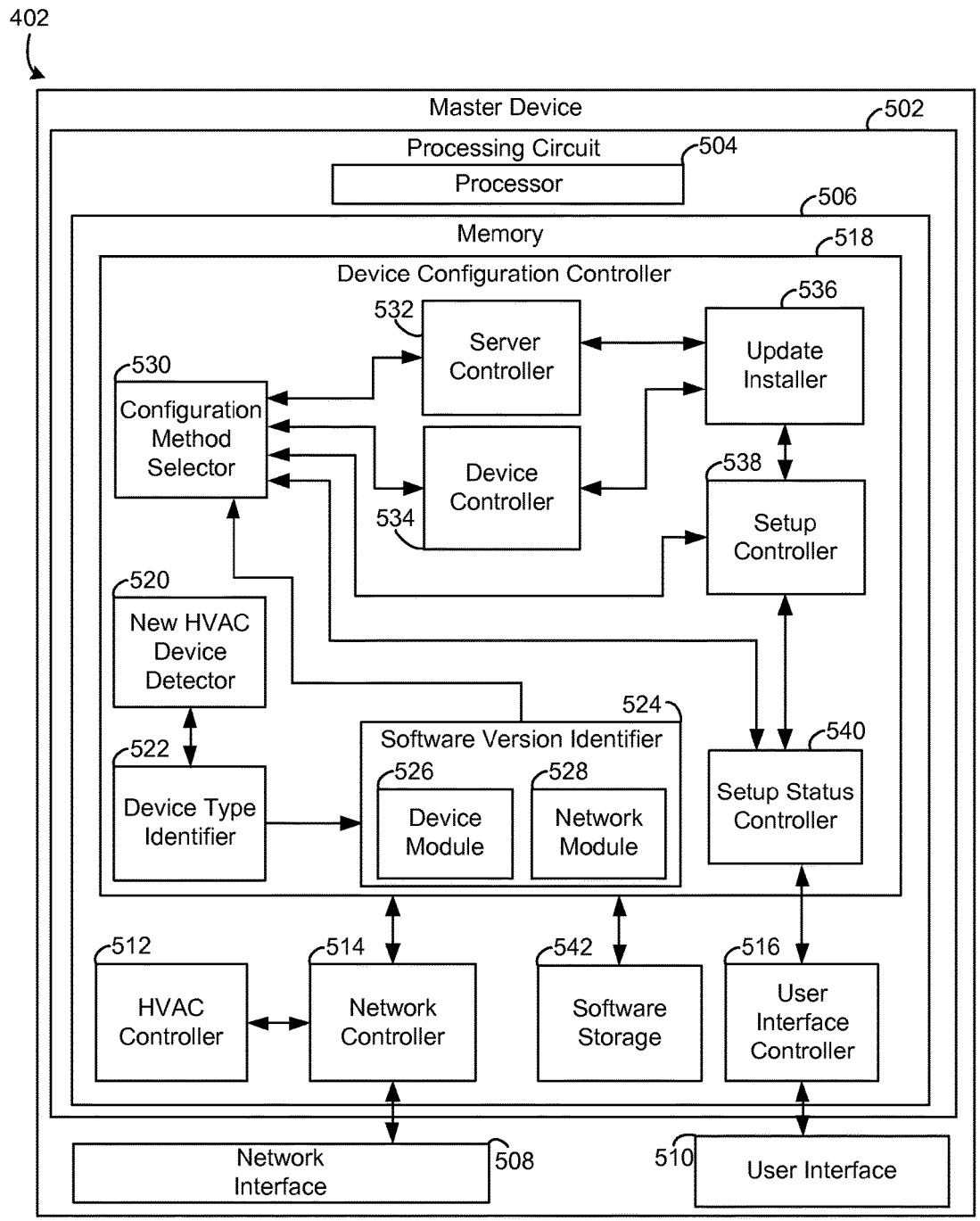
FIG. 5 is a diagram of the master device of FIG. 4 in greater detail, according to an exemplary embodiment.

Referring now to FIG. 5, a block diagram illustrating master device 402 in greater detail is shown, according to an exemplary embodiment. Master device 402 is shown to include a processing circuit 502. Master device may also include a network interface 508 and a user interface 510. Processing circuit 502 is shown to include a processor 504 and memory 506. Processor 504 can be a general purpose or specific purpose processor, an application specific integrated circuit (ASIC), one or more field programmable gate arrays (FPGAs), a group of processing components, or other suitable processing components. Processor 504 may be configured to execute computer code or instructions stored in memory 506 or received from other computer readable media (e.g., CDROM, network storage, a remote server, etc.).

Memory 506 can include one or more devices (e.g., memory units, memory devices, storage devices, etc.) for storing data and/or computer code for completing and/or facilitating the various processes described in the present disclosure. Memory 506 can include random access memory (RAM), read-only memory (ROM), hard drive storage, temporary storage, non-volatile memory, flash memory, optical memory, or any other suitable memory for storing software objects and/or computer instructions. Memory 506 can include database components, object code components, script components, or any other type of information structure for supporting the various activities and information structures described in the present disclosure. Memory 506 can be communicably connected to processor 504 via processing circuit 502 and can include computer code for executing (e.g., by processor 504) one or more processes described herein.

Memory 506 can include an HVAC controller 512, a network controller 514, a user interface controller 516, and a device configuration controller 518. In some embodiments, HVAC controller 512 provides a control signal to HVAC device(s) 406 via network controller 418 and/or network interface 508. The control signal may cause the HVAC device(s) 406 to condition and/or heat a zone and/or building to a setpoint temperature. Further, the control signals may cause HVAC device(s) 406 to achieve a humidity value in a building and/or zone based on a humidity setpoint.

Network controller 514 may contain instructions to communicate with a network (e.g., network 404). In some embodiments, network controller 514 contains instructions to communicate over a wireless network Wi-Fi network, a Zigbee network, and/or a Bluetooth network via network interface 508. Network controller 514 may be able to facilitate communication a local area network or a wide area network (e.g., the Internet, a building WAN, etc.). In some embodiments, network controller 514 may communicate over a wired means and may use a variety of communications protocols (e.g., N2, BACnet, IP, LON, RS-485, RS-232 etc.). Network controller 514 may be configured to communicate over any kind of network.

User interface controller 516 is configured to display icons, images, and text on user interface 510. In some embodiments, user interface controller 516 is configured to display a prompt to a user via user interface 510. In some embodiments, the prompt identifies a software update version and/or software patch number necessary to communicate with HVAC device(s) 406. In some embodiments, the user interface controller 516 may display a button to a user via user interface 510. Pressing the button may cause the network controller 514 to send a request to software update server 408 as described with reference to FIG. 4 for a software update. In various embodiments, user interface 510 is a touch screen display. User interface 510 may be one or a combination of a resistive touch screen device, a capacitive touch screen device, a projective capacitive touch screen device, and/or any other display screen and/or touch input device. In some embodiments, user interface has physical buttons such as push buttons, dials, knobs and/or any other physical button. User interface controller 516 may monitor the status and/or value of each button, dial, knob, and/or physical button.

Device configuration controller 518 may be configured to communicate with software update server 408 and HVAC device(s) 406 via network controller 514, network interface 508, and network 404. In some embodiments, device configuration controller 518 may be configured to run setup operations on HVAC device(s) 406 and/or receive software updates from HVAC device(s) 406 and/or software update server 408 when HVAC device(s) 406 are physically installed by a technician on network 404.

Device configuration controller 518 includes new HVAC device detector 520. New HVAC device detector 520 may be configured to monitor activity on network 404 via network controller 514 and network interface 508. New HVAC device detector 520 may be configured to identify a new device (e.g., HVAC device 406) installed in a building (e.g., building 10) that is communicating over network 404. In some embodiments, new HVAC device detector 520 is configured to detect HVAC device(s) 406 by determining that a new address is being used to communicate over network 404. In some embodiments, the address is a MAC address, an IP address, a MS/TP address, a device name (i.e., an identifier), and/or any other address. In various embodiments, new HVAC device detector 520 determines that the new device has been installed by determining that the address associated and/or broadcast by the new device is unrecognized and/or otherwise unknown to master device 402. In various embodiments, the address is associated with a device that has not yet been configured and/or paired with master device 402.

Device configuration controller 518 may include device type identifier 522. Device type identifier 522 may be configured to determine a device type of a newly installed HVAC device (e.g., HVAC device 406). In some embodiments, the device type may be determined by the device address. In some embodiments, device type identifier 522 includes a database of device addresses. In some embodiments, each device address is linked to a software version. In various embodiments, the database of device addresses indicates what devices (e.g., HVAC device(s) 406) master device 402 is configured to communicate with. In some embodiments, device type identifier 522 is configured to determine the type of device installed on network 404. For example, device type identifier 522 may be configured to determine if the device is a pneumatic actuator, an indoor control device and/or system, an outdoor control device and/or system, a temperature sensor, etc. Device configuration controller 518 may send a command to an HVAC device (e.g., HVAC device(s) 406) requesting that a device identifier be sent to the master device 402. The master device 402 may send the identifier to software update server 408 where the HVAC device 406 can be identified. The software update server 408 may reply to device configuration controller 518 with the identity of the newly install HVAC device.

In various embodiments, the database of device type identifier 522 is used to determine if the newly installed HVAC device is configured to push a software update to the master device 402. In some embodiments, the database includes a list of addresses associated with devices (e.g., HVAC device 406) that are configured to push software updates to master device 402. In some embodiments, device type identifier 522 may tell configuration method selector to retrieve or to not retrieve a software update from the new device based on searching the database. If the search results in a determination that the newly identified address is associated with a device that can push a software update to master device 402, configuration method selector 530 may be configured to retrieve the software update from the newly installed device. If the search results in a determination that the newly identified address is not associated with a device that can push a software update to master device 402, configuration method selector 530 can attempt a different software update method.

Software version identifier 524 may be configured to determine the software version necessary for communicating with an HVAC device 406. In various embodiments, software version identifier 524 is configured to receive a software version from a newly installed HVAC device (e.g., HVAC device 406). Software version identifier 524 may be configured to query HVAC device 406 for the identity of the required software and/or may query network 404 for the identifier of the required software. Software version identifier 524 may include a device module 526 and a network module 528. In some embodiments device module 526 may be configured to send a query to HVAC device 406. In some embodiments, HVAC device 406 may reply with the identity of the necessary software version needed for communicating with HVAC device 406. In various embodiments, device module 526 may allow HVAC device 406 to access the current software and/or firmware (e.g., software storage 542) so that HVAC device 406 can determine the correct and/or compatible software update. In some embodiments, the HVAC device (e.g., HVAC device 406) may automatically push a software version identifier to master device 402 via network 404. In some embodiments, the device module 526 may identify if the software currently being run on master device 402 is correct, may determine that a software patch is needed for communicating with the HVAC device(s) 406, and/or may determine that a complete software update is needed for the master device 402.

In some embodiments, software version identifier 524 may include network module 528. In some embodiments, network module 528 may send the identity of the device determined by device type identifier 522 to the building management system 410 and/or the software update server 408. The identity sent may be accompanied by a request for the software version necessary for communicating with the HVAC device(s) 406.

Master device 402 may include configuration method selector 530. In some embodiments, configuration method selector 530 may be configured to select between using the currently installed software on master device 402 to communicate with and/or setup (i.e., pair, configure, etc.) the HVAC device(s) 406, retrieve a software update and/or software patch from the HVAC device(s) 406, and/or retrieve the software update and/or software patch from the software update server 408.

In some embodiments, configuration method selector 530 may be configured to attempt sequential methods for communicating and configuring the HVAC device(s) 406. In some embodiments, configuration method selector 530 may first attempt to setup the HVAC device(s) 406 if configuration method selector 530 has identified that master device 402 has the correct software for communicating with and configuring the HVAC device(s) 406. In some embodiments, configuration method selector 530 determines that master device 402 has the correct software based on determining that the address associated with HVAC device 406 is an address known and/or stored in a database on configuration method selector 530. In some embodiments, the configuration method selector 530 will next attempt to retrieve the necessary software and/or software patch directly from the HVAC device(s) 406. In some embodiments, the configuration method selector 530 will attempt to retrieve the necessary software and/or software patch needed to communicate with the HVAC device(s) 406 from software update server 408 if the master device 402 cannot retrieve the necessary software and/or software patch from the HVAC device(s) 406. In various embodiments, configuration method selector 530 will receive a command from software update server 408 that a software update is being pushed to master device 402. Configuration method selector 530 may cause the software update to be installed. In various embodiments, configuration method selector 530 may receive an install command from a newly installed HVAC device (e.g., HVAC device(s) 406) and/or may be pushed a software version (e.g., software package 412). In some embodiments, the newly installed HVAC device (e.g., HVAC device(s) 406) may be configured request a software version identifier from configuration method selector 530. Configuration method selector may reply with the software version identifier.

Server controller 532 may be configured to communicate with software update server 408 via network controller 514, network interface 508, and/or network 404. In some embodiments, server controller 532 is configured to receive a software update (e.g., a software update file, a software update patch, etc.) pushed from software update server 408. In some embodiments, server controller 532 may be configured to send a request to software update server 408 for a software update and/or a software patch when HVAC device 406 is identified by new HVAC device detector 520. In some embodiments, server controller 532 may send at least one of the identity of the HVAC device 406, the address with which the HVAC device 406 communicates with, a current software version of master device 402, and/or a request for known software update package and/or patch. In some embodiments, the software update server 408 replies to the server controller 532 with the software update package and/or patch based on the requested software update package and/or patch.

In some embodiments, server controller 532 may be configured to determine the necessary software version based on the identity of HVAC device 406, the address with which the HVAC device 406 communicates, and/or the current software version of master device 402. In some embodiments, the server controller 532 receives the software version and/or patch and causes update installer 536 to install the software update and/or patch.

In some embodiments, device controller 534 is pushed a software version installation message from HVAC device 406. In some embodiments, the message identifies that HVAC device 406 does not have the correct software to communicate with HVAC device 406. The message may contain a profile (e.g., software name, software number, etc.) of the software to be installed. In various embodiments, device controller 534 sends the required software version identifier to HVAC device 406 via network 404. If HVAC device 406 has the software version necessary for communicating with device controller 534, HVAC device 406 may push the correct software package (e.g., software package 412). Device controller 534 can be configured to send a software request directly to the HVAC device 406. The software request may be sent in response to a user indicating the software be updated via user interface 510. In some embodiments, the request may be sent by network controller 514 via network interface 508 and network 404. In some embodiments, HVAC device 406 replies by sending software package 412 to device controller 534. Software package 412 may be a software update (e.g., a new software package) and/or a software patch that can be installed on and/or modify the current software on master device 402. Device controller 534 may cause update installer 536 to install software package 412.

Update installer 536 can be configured to install new software packages and/or software patches (e.g., software package 412). In some embodiments, update installer 536 causes the master device 402 to reboot and install the new software and/or software patch. In some embodiments, update installer 536 may cause master device 402 to install the software in the background while master device 402 is booted (i.e., running). Update installer 536 may be configured to cause user interface controller 516 to display an install message on user interface 510. The install message may prompt a user to install the software package and/or patch. If the user does not press a button causing the master device 402 to install the software package and/or patch, the update installer 536 may wait a predefined amount of time before automatically beginning installation of the software package and/or patch. In some embodiments, the amount of time is displayed on user interface 510 as a countdown.

Setup controller 538 can be configured to setup an HVAC device (e.g., HVAC device 406). In some embodiments, setup new HVAC device controller may setup the HVAC device when configuration method selector 530 determines that no software update and/or patch (e.g., software package 412) is needed. Setting up HVAC device may include mapping BACnet MS/TP and/or N2 points. In some embodiments, master device 402 maps the BACnet and/or N2 points of the HVAC device. In various embodiments, setup controller 538 maps only the points necessary for operating the HVAC device.

Setting up the HVAC device with setup controller 538 may include selecting a communications address for the HVAC device. In various embodiments, the address may be IP addresses, BACnet addresses, N2 addresses, and/or any other address or identifier. In some embodiments, setup controller 538 may communicate with the HVAC device to verify that it is operating properly. Setup controller 538 may test points, read and/or write registers, send test commands, and/or any other action which may identify that the HVAC device is operating and setup correctly. In some embodiments, setup controller 538 may cause user interface controller 516 to display a message on user interface 510 that the HVAC device has been properly installed and/or has been properly configured.

Setup status controller 540 may be configured to monitor the setup steps of HVAC devices (e.g., HVAC device 406). In various embodiments, setup status controller 540 may cause user interface controller 516 to display step by step confirmation of the installation and setup of HVAC devices (e.g., HVAC device 406) on user interface 510. In some embodiments, setup status controller 540 may monitor the progress of updating software for master device 402. Setup status controller 540 can be configured to cause user interface controller 516 to display a message on user interface 510 indicating the method used to update the software (i.e., software retrieved from server update server 408 or software retrieved from HVAC device 406). In various embodiments, setup status controller 540 may present a message received from HVAC device 406 to a user via user interface 510. The message may instruct the user of master device 402 to retrieve s software update (e.g., software package 412) from HVAC device 406.

In some embodiments, setup status controller 540 causes user interface controller 516 to display a message on user interface 510 that the software cannot be retrieved from software update server 408 and/or HVAC device 406. The message may identify the software version necessary for communicating with HVAC device 406. In some embodiments, the message includes a web address to search for and download the correct software version. In various embodiments, the message includes a phone number of a technician.

In some embodiments, memory 506 includes software storage 542. In various embodiments, software storage 542 stores firmware and/or an operating system. In some embodiments, software storage 542 is a software package and/or code for master device 402. Software storage 542 may be configured to execute commands on processor 504. In various embodiments, device configuration controller 518, HVAC controller 512, network controller 514, and user interface controller 516 are stored in software storage 542. Software storage 542 may be configured to receive new software from update installer 536. In some embodiments, update installer 536 installs software updates received from software update server 408 and/or HVAC device 406 and installs the software updates in software storage 542. In some embodiments, software storage 542 is RAM, ROM, EPROM, EEPROM, CD-ROM or other optical disk storage, magnetic disk storage or other magnetic storage devices.

Figure 6:
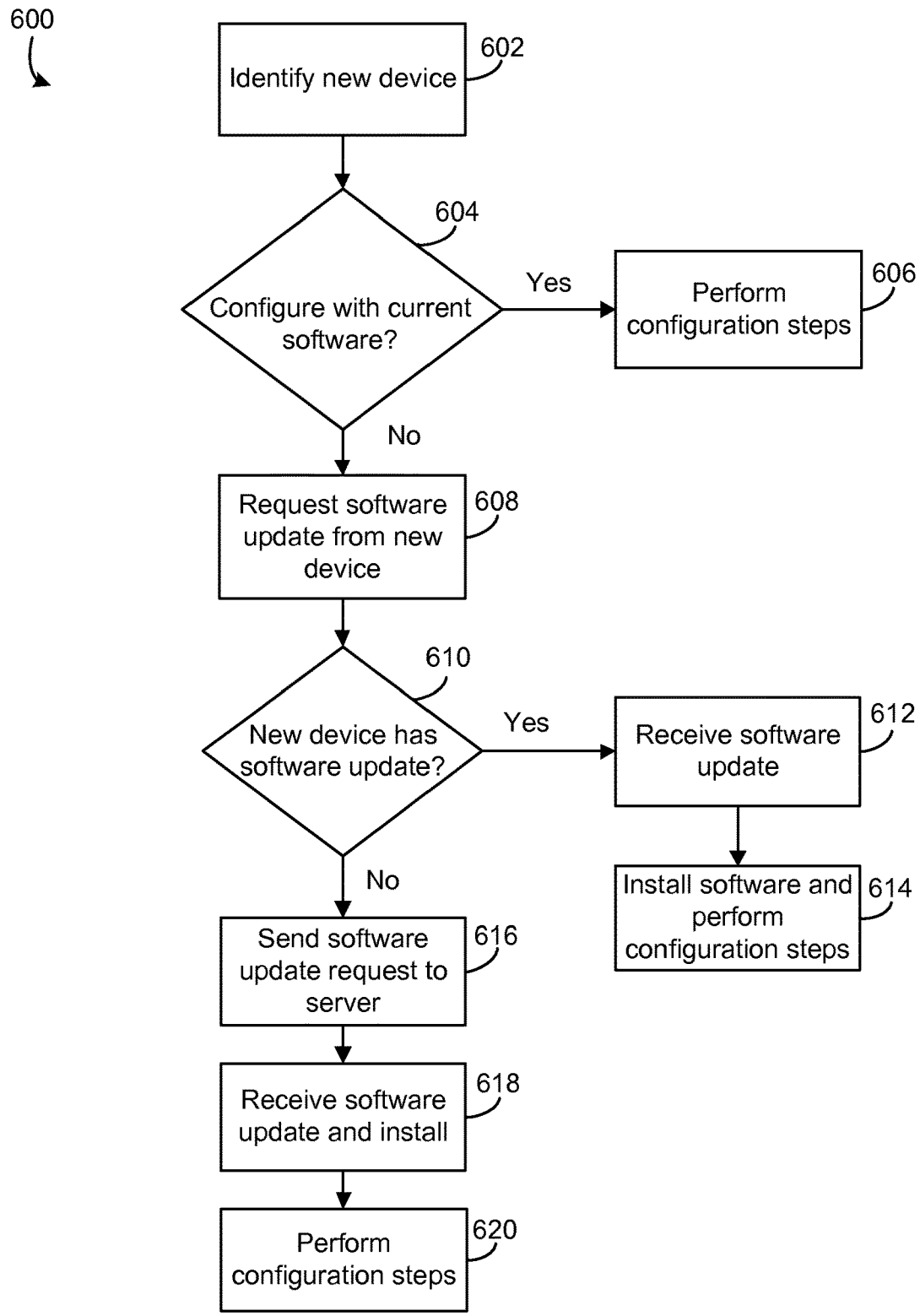
FIG. 6 is a flow diagram illustrating a process for updating software for the master device of FIGS. 4-5 and configuring the HVAC device of FIG. 4, according to an exemplary embodiment.

Referring now to FIG. 6, a flow diagram of process 600 for installing software updates on a device is shown, according to an exemplary embodiment. In some embodiments, process 600 is performed by master device 402, as described with reference to FIGS. 4-5. In step 602, the master device 402 determines that a new device (e.g., HVAC device 406) has been connected to network 404 or has otherwise been communicably coupled with master device 402. In some embodiments, master device 402 determines that a new device has been connected by identifying a new address being broadcast over network 404 and/or to master device 402.

In step 604, master device 402 determines if the master device 402 can configure the new device based on the current software and/or setup variables stored on master device 402. If the master device 402 has the correct software and/or setup variables, master device 402 performs configuration steps (step 606). Step 606 may include mapping points of the new device, sending test data to the new device, and/or any other configuration and/or testing action.

If master device 402 determines that master device 402 does not have the correct software and/or setup variables, master device 402 performs step 608. In step 608, master device 402 sends a request to the new device for a software update. In some embodiments, the master device 402 may determine what version of the software is necessary for communicating with the new device. In various embodiments, master device 402 sends the software version needed to communicate with the new device to the new device. In some embodiments, the new HVAC device automatically pushes the software update to master device 402. In some embodiments, the new HVAC device first determines the necessary software version and/or update by sending an information request to master device 402. The information request may be a request for the current software on master device 402, an identifier of master device 402, and/or any other information.

In step 610, master device 402 determines if the software update can be received from the new device. If master device 402 determines that the software update can be received from the new device, the master device 402 performs step 612. In some embodiments, determining that the software update can be received includes receiving a confirmation from the new device. The confirmation may include a message indicating that the new device is configured to perform the update process and includes the correct software for master device 402. In some embodiments, step 612 may include displaying a message on a user interface (e.g., user interface 516) of master device 402 with a user prompt to retrieve and/or install the new software.

In step 612, master device 402 receives the software update from the new device. In some embodiments, the software update is a complete software package and/or a software patch (e.g., software package 412). In various embodiments, the software update is a plugin and/or other software module that can be installed specifically for setting up and communicating with the new device. In step 614, master device 402 installs the new software and configures the new device. Step 614 may include mapping points of the new device, sending test data to the new device, and/or any other configuration and/or testing action.

If master device 402 cannot receive a software update from the new device, master device 402 sends a software request to a software update server (e.g., software update server 408) (step 616). In some embodiments, the request includes the necessary software version, software patch, and/or software plugin. In various embodiments, the request includes the current software version for the master device 402. The request may also include the address of the new device and a request that the software update server identify the software version necessary. In various embodiments, the software update server identifies the software version based on the address of the new device and the current software on the master device 402. In some embodiments, step 616 includes displaying a phone number for a technician. The technician may be able to push software via network 404 to master device 402 via a software update server.

In step 618, master device 402 receives the software update from software update server 408 and installs the software. In various embodiments, the software update has been requested by master device 402. In various embodiments, the software update is pushed to master device 402 without a request from master device 402. Installing the software may cause the master device 402 to reboot and install the new software and/or software patch during a boot cycle. In some embodiments, the software update may be installed in the background while master device 402 is running. In some embodiments, installing the software update includes causing an install message to be displayed on user interface 510. The install message may prompt a user to install the software package and/or patch. If the user does not press a button causing the master device 402 to install the software package and/or patch, master device 402 may wait a predefined amount of time before installing the software package and/or patch. In some embodiments, the amount of time is displayed on user interface 510 as a countdown. Step 620 may include mapping points of the new device, sending test data to the new device, and/or any other configuration and/or testing action.

Figure 7:
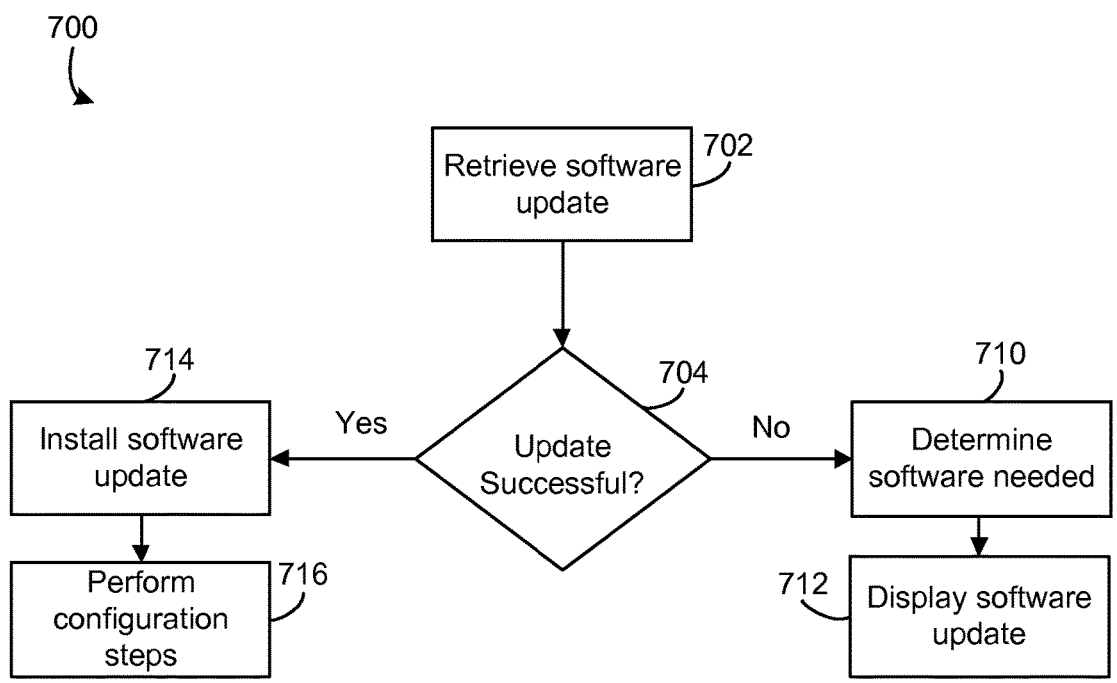
FIG. 7 is a flow diagram illustrating a process for updating software for the master device of FIGS. 4-5, according to an exemplary embodiment.

Referring now to FIG. 7, a flow diagram of process 700 for installing a software update is shown, according to an exemplary embodiment. In some embodiments, process 700 is performed by master device 402, as described with reference to FIGS. 4-5. In step 702, master device 402 retrieves a software update for an HVAC device (e.g., HVAC device 406). In some embodiments, retrieving the software update includes retrieving software package 412 from HVAC device 406. In various embodiments, retrieving a software update includes sending a request to software update server 408 and/or receiving a software update push. In step 704, if master device 402 determines that it was unsuccessful in retrieving a software update and/or patch, master device performs step 710. In some embodiment, master device 402 first attempts to retrieve the software update and/or software patch from HVAC device 406. If master device 402 determines that the software retrieval from HVAC device 406 has failed and/or is not possible, master device 402 attempts to retrieve the software update from software update server 408. In some embodiments, master device 402 is not enabled to retrieve the software update from software update server 408. Master device 402 may display a phone number for a technician in the event that master device 402 cannot retrieve a software update from either HVAC device 406 and software update server 408. The technician may be able to cause a software update to be pushed to master device 402 via network 404.

In some embodiments, when master device 402 fails to retrieve the software update and/or patch from HVAC device 406 and software update server 408, master device 402 performs step 710. In step 710, the master device 402 determines the necessary software version, patch, and/or plugin necessary to communicate with HVAC device 406. In some embodiments, the software version is determined by sending a query to software update server 408. In some embodiments, the query includes the current software version of master device 402, an address of HVAC device 406, a name and/or identifier of HVAC device 406, and/or any other information necessary for determining the necessary software update. In some embodiments, master device 402 includes a software version database and is able to identify the software version, patch, and/or plugin necessary via the database.

In step 712, master device 402 displays the software update to be installed on user interface 510. In some embodiments, user interface 510 displays the name of the software, the reason for updating the software, and/or directions for updating the software. In some embodiments, the user interface 510 displays a message indicating that the master device 402 has attempted to retrieve the software automatically and has failed. In various embodiments, the user interface 510 may display a message to call a service technician and display a phone number for the service technician. In some embodiments, user interface 510 may display a message indicating the master device 402 is unable to determine the identity of the necessary software update and should contact the service technician for help.

In step 704, if the master device 402 determines that the software has been successfully retrieved, the master device 402 may install the software update (step 714). In some embodiments, installing the software may cause the master device 402 to reboot and install the new software and/or software patch during a boot cycle. In some embodiments, the software update may be installed in the background while master device 402 is running. In some embodiments, installing the software update includes causing an install message to be displayed on user interface 510. The install message may prompt a user to install the software package and/or patch. If the user does not press a button causing the master device 402 to install the software package and/or patch, master device 402 may wait a predefined amount of time before installing the software package and/or patch. In some embodiments, the amount of time is displayed on user interface 510 as a countdown. In step 716, master device 402 maps the points of HVAC device 406, sends test data to HVAC device 406, and/or performs any other configuration and/or testing action. In some embodiments, master device 402 performs step 716 in response to successfully updating the software of master device 402.

Figure 8:
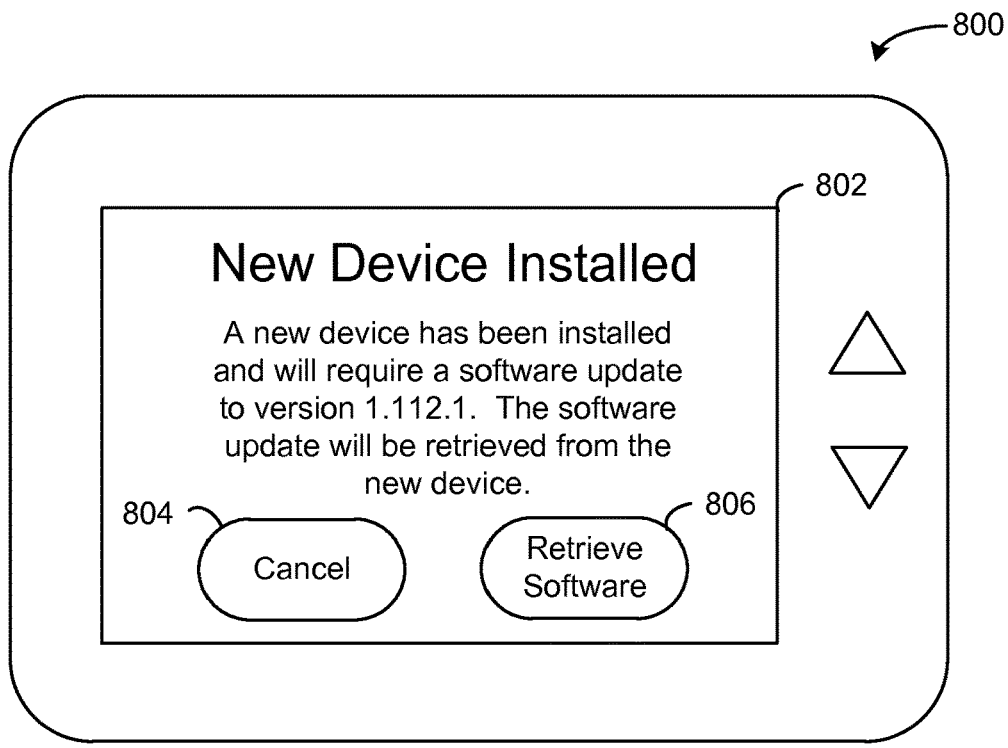
FIG. 8 is a drawing of a display for the master device of FIGS. 4-5 requesting a user install a software update from the HVAC device 406 of FIGS. 4-5, according to an exemplary embodiment.

Referring now to FIG. 8, a drawing 800 of an installation prompt 802 for master device 402 is shown, according to an exemplary embodiment. In some embodiments, the installation prompt 802 may be displayed on user interface 516 of master device 402. In some embodiments, the installation prompt 802 may identify that a new HVAC device and/or system has been installed inside or outside a building (e.g., building 10). Installation prompt 802 may identify that the software version of master device 402 is not currently up-to-date and/or not the proper version for communicating with the new HVAC device and/or system. Installation prompt 802 may ask the user to allow the master device 402 to automatically retrieve and/or install the software version from an HVAC device (e.g., HVAC device 406). In some embodiments, the user may be present with two buttons. The buttons may be a cancel button (e.g., cancel button 804) and a confirmation button (e.g., retrieve software button 806). Pressing cancel button 804 may cause the master device 402 to ignore the HVAC device and operate as normal. Pressing the retrieve software button 806 may cause master device 402 to retrieve the necessary software update from the HVAC device and install it accordingly. In various embodiments, prompt 802 is displayed based on a device incompatibility determination made by master device 402. In various embodiments, prompt 802 and/or a command to display prompt 802 is pushed to master device 402 from an HVAC device (e.g., HVAC device 406).

Figure 9:
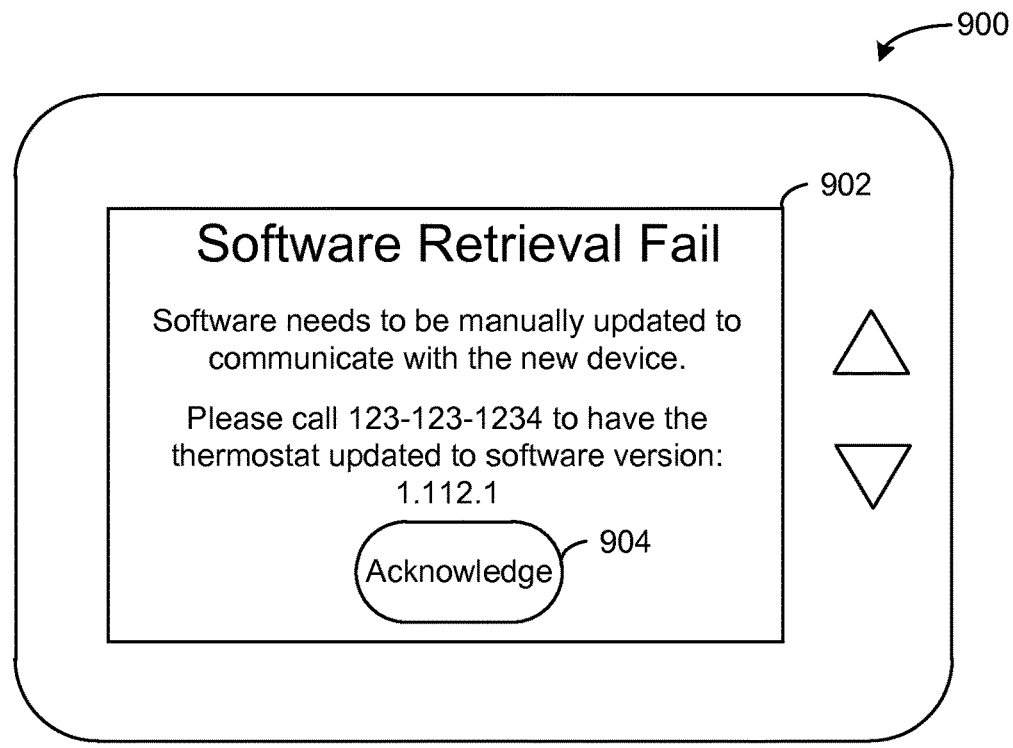
FIG. 9 is a drawing of a display for the master device of FIGS. 4-5 notifying a user that a software retrieval has failed, according to an exemplary embodiment.

Referring now to FIG. 9, a drawing 900 of a software retrieval failure message 902 is shown, according to an exemplary embodiment. In some embodiments, message 902 may be displayed on master device 402. In some embodiments, the message 902 may be displayed whenever retrieving a software update from a HVAC device (e.g., 406) and/or software update server 408. In some embodiments, message 902 may include the software version that the user needs to manually install. Message 902 may include an acknowledge button 904. If the user presses the acknowledge button, the master device 402 may be configured to prompt the user to install the software via an SD card, a USB drive and/or any other method for installing the software update. In some embodiments, failure message 902 may include a technician phone number and/or other technician contact information.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A thermostat for a building, the thermostat comprising:
a communications interface communicably coupled to an heating, ventilation, and air conditioning (HVAC) network; and
a processing circuit configured to:
operate based on a first thermostat software version, the first thermostat software version configured to operate a first set of HVAC devices, the first thermostat software version comprising a plurality of recognized network addresses, each of the plurality of recognized network addresses associated with one HVAC device of the first set of HVAC devices;
determine, while operating on the first thermostat software version, that an HVAC device is connected to the HVAC network by receiving, via the communications interface, a network address from the HVAC device, wherein the HVAC device is configured to store a second thermostat software version for the thermostat, wherein the network address is an address preassigned to the HVAC device identifying communications of the HVAC device on the HVAC network;
determine, while operating on the first thermostat software version, whether the second thermostat software version stored by the HVAC device is needed to operate the HVAC device by determining that the network address is an unrecognized network address by comparing the network address to the plurality of recognized network addresses to determine whether the network address is one of the plurality of recognized network addresses; and
retrieve, while operating on the first thermostat software version, via the communications interface, the second thermostat software version from the HVAC device via the communications interface; and
replace the first thermostat software version with the second thermostat software version by installing the second thermostat software version in response to a determination that the second thermostat software version is needed to operate the HVAC device, wherein the second thermostat software version is configured to operate a second set of HVAC devices, the second set of HVAC devices comprising the HVAC device.

2. The thermostat of claim 1, further comprising a user interface configured to present information to a user and receive input from the user;
wherein the processing circuit is configured to:
cause the user interface to display a message prompting the user to give permission to the thermostat to retrieve, via the communications interface, the second thermostat software version from the HVAC device and install the second thermostat software version; and
retrieve, via the communications interface, the second thermostat software version from the HVAC device and install the second thermostat software version in response to a determination that the user gives the permission to the thermostat.

3. The thermostat of claim 1, further comprising a user interface configured to present information to a user and receive input from the user;
wherein the processing circuit is configured to:
cause the user interface to display a message prompting the user to call a service technician in response to a determination that the thermostat has failed to retrieve the second thermostat software version from the HVAC device; and
receive the second thermostat software version from a software update server via the communications interface and install the second thermostat software version.

4. The thermostat of claim 1, wherein the processing circuit is configured to determine that the second thermostat software version can be retrieved from the HVAC device based on the network address of the HVAC device received via the communications interface and a database, wherein the thermostat further comprises the database, wherein the database comprises the plurality of recognized network addresses associated with HVAC devices that can push software updates to the thermostat.

5. The thermostat of claim 4, wherein the processing circuit is configured to determine if the second thermostat software version can be retrieved from the HVAC device by searching the database with the network address.

6. The thermostat of claim 1, wherein the processing circuit is configured to cause the communications interface to send configuration commands to the HVAC device in response to a determination that the second thermostat software version has been successfully installed.

7. The thermostat of claim 1, wherein the processing circuit is configured to:
generate control signals for the HVAC device, wherein the control signals cause the HVAC device to heat or cool the building to a setpoint; and
cause the communications interface to send the control signals to the HVAC device.

8. The thermostat of claim 1, wherein the processing circuit is configured to determine whether the second thermostat software version is needed to operate the HVAC device by sending a message to a software update server via the HVAC network, wherein the message comprises an identifier associated with the HVAC device and an indication of the first thermostat software version of the thermostat.

9. A method for updating software for a thermostat, the method comprising:
operating, by a processor, a first thermostat software version, the first thermostat software version configured to operate a first set of HVAC devices, the first thermostat software version comprising a plurality of recognized network addresses, each of the plurality of recognized network addresses associated with one HVAC device of the first set of HVAC devices;
determining, by the processor while operating on the first thermostat software version, that a heating, ventilation, and air conditioning (HVAC) device is connected to an HVAC network by receiving a network address from the HVAC device, the HVAC device configured to store a second thermostat software version for the thermostat, wherein the network address is an address preassigned to the HVAC device identifying communications of the HVAC device on the HVAC network;
determining, by the processor while operating on the first thermostat software version, whether the second thermostat software version stored by the HVAC device is needed to operate the HVAC device by determining that the network address is an unrecognized network address by comparing the network address to the plurality of recognized network addresses to determine whether the network address is one of the plurality of recognized network addresses;

retrieving, by the processor via the HVAC network while operating on the first thermostat software version, the second thermostat software version from the HVAC device in response to a determination that the second thermostat software version is needed to operate the HVAC device; and replacing, by the processor, the first thermostat software version with the second thermostat software version by installing the second thermostat software version in response to the determination that the second thermostat software version is needed to operate the HVAC device, wherein the second thermostat software version is configured to operate a second set of HVAC devices, the second set of HVAC devices comprising the HVAC device.

10. The method of claim 9, further comprising:
causing, by the processor, a user interface to display a message prompting a user to give permission to the thermostat to retrieve the second thermostat software version from the HVAC device and install the second thermostat software version; and
retrieving, by the processor, the second thermostat software version from the HVAC device and installing the second thermostat software version in response to a determination that the user gives the permission to the thermostat.

11. The method of claim 9, further comprising:
causing, by the processor, a user interface to display a message prompting a user to call a service technician in response to a determination that the thermostat has failed to retrieve the second thermostat software version from the HVAC device; and
receiving, by the processor, the second thermostat software version from a software update server via a communications interface and installing the second thermostat software version.

12. The method of claim 9, further comprising performing, by the processor, configuration steps for the HVAC device in response to a determination that the second thermostat software version has been successfully installed.

13. The method of claim 9, further comprising:
generating, by the processor, control signals for the HVAC device, wherein the control signals cause the HVAC device to heat or cool a building to a setpoint; and
causing, by the processor, a communications interface to send the control signals to the HVAC device.

14. The method of claim 9, further comprising determining, by the processor, that the second thermostat software version can be retrieved from the HVAC device based on the network address and a database, wherein the database comprises network addresses associated with HVAC devices that can push software updates to the thermostat.

15. The method of claim 14, further comprising determining, by the processor, if the second thermostat software version can be retrieved from the HVAC device by searching the database with the network address.

16. A building system for a building, the system comprising:

an heating, ventilation, and air conditioning (HVAC) device configured to control a physical condition of the building and store a second thermostat software version; and
a controller comprising:
a communications interface communicably coupled to an HVAC network; and
a processing circuit configured to:
operate based on a first thermostat software version, the first thermostat software version configured to operate a first set of HVAC devices, the first thermostat software version comprising a plurality of recognized network addresses, each of the plurality of recognized network addresses associated with one HVAC device of the first set of HVAC devices;
determine, while operating on the first thermostat software version, that the HVAC device is connected to the HVAC network by receiving, via the communications interface, a network address from the HVAC device, wherein the network address is an address preassigned to the HVAC device identifying communications of the HVAC device on the HVAC network;
determine, while operating on the first thermostat software version, whether the second thermostat software version is needed to operate the HVAC device by determining that the network address is an unrecognized network address by comparing the network address to the plurality of recognized network addresses to determine whether the network address is one of the plurality of recognized network addresses;
retrieve, while operating on the first thermostat software version, via the communications interface, the second thermostat software version from the HVAC device via the communications interface; and
replace the first thermostat software version with the second thermostat software version by installing the second thermostat software version in response to a determination that the second thermostat software version is needed to operate the HVAC device, wherein the second thermostat software version is configured to operate a second set of HVAC devices, the second set of HVAC devices comprising the HVAC device; and
cause the communications interface to send configuration commands to the HVAC device in response to a determination that the controller has installed the second thermostat software version.

17. The system of claim 16, further comprising a user interface configured to present information to a user and receive input from the user;
wherein the processing circuit is configured to:
cause the user interface to display a message prompting the user to give permission to the controller to retrieve, via the communications interface, the second thermostat software version from the HVAC device and install the second thermostat software version; and
retrieve, via the communications interface, the second thermostat software version from the HVAC device and install the second thermostat software version in response to a determination that the user gives the permission to the controller.

18. The system of claim 16, further comprising a user interface configured to present information to a user and receive input from the user;

wherein the processing circuit is configured to:

cause the user interface to display a message prompting the user to call a service technician in response to the determination that the second thermostat software version is needed to operate the HVAC device; and receive, via the communications interface, the second thermostat software version from a software update server via the communications interface and install the second thermostat software update.

19. The system of claim 16, wherein the processing circuit is configured to determine that the second thermostat software version update can be retrieved from the HVAC device based on the network address of the HVAC device received via the communications interface, wherein the controller further comprises a database of network addresses associated with HVAC devices that can push software updates to the controller.

20. The system of claim 19, wherein the processing circuit is configured to determine if the second thermostat software version can be retrieved from the HVAC device by searching the database with the network address.

\* \* \* \* \*